July 1, 1958 S. K. MOXNESS 2,840,856
MOLDING APPARATUS AND PROCEDURE
Filed Oct. 18, 1952 3 Sheets-Sheet 2

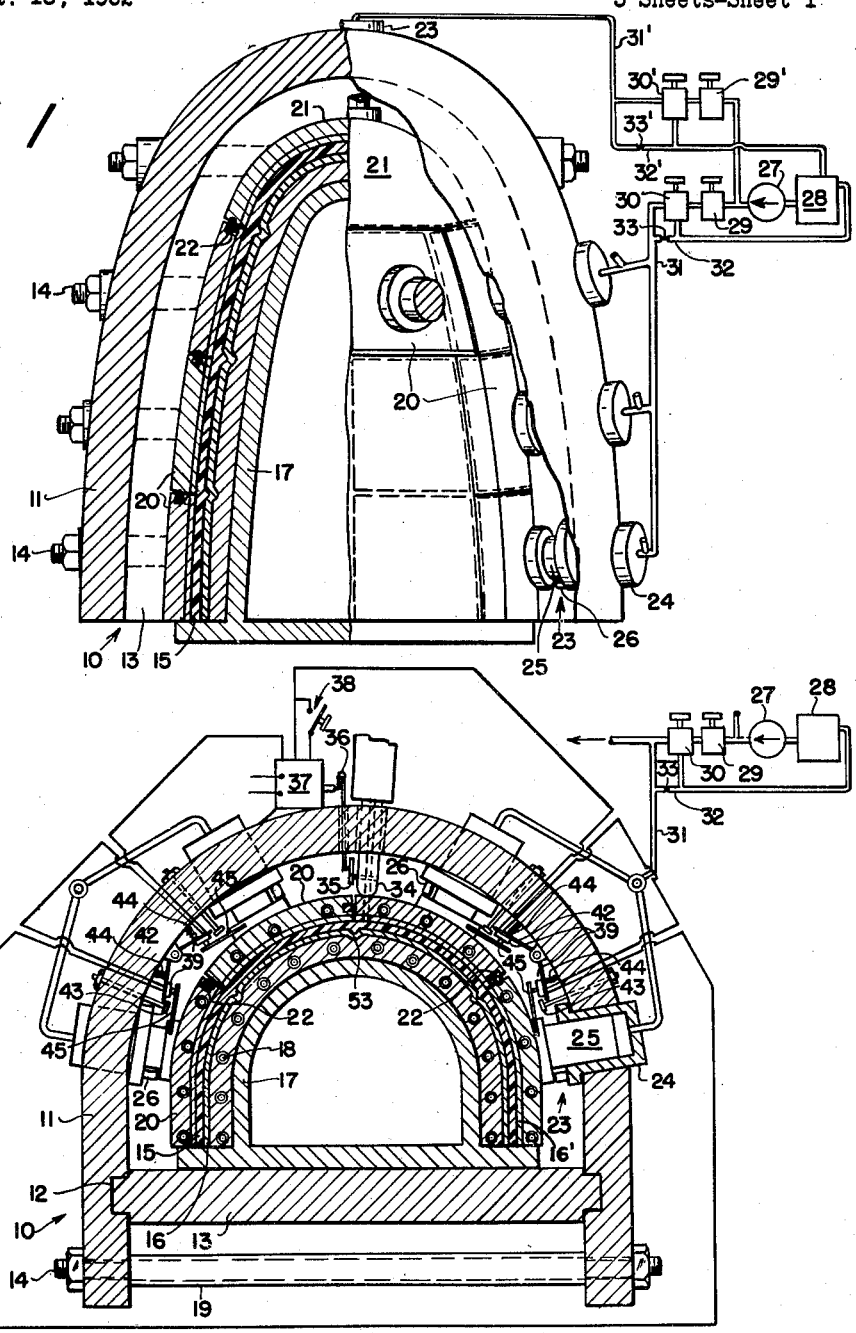

INVENTOR.
SVEN K. MOXNESS
BY
George H. Fisher
ATTORNEY

July 1, 1958 S. K. MOXNESS 2,840,856
MOLDING APPARATUS AND PROCEDURE
Filed Oct. 18, 1952 3 Sheets-Sheet 3

INVENTOR.
SVEN K. MOXNESS
BY
*George H. Fisher*
ATTORNEY

United States Patent Office 2,840,856
Patented July 1, 1958

2,840,856
MOLDING APPARATUS AND PROCEDURE

Sven K. Moxness, Racine, Wis., assignor to Minneapolis-Honeywell Regulator Company, Minneapolis, Minn., a corporation of Delaware Application October 18, 1952, Serial No. 315,471

8 Claims. (Cl. 18—30)

This invention relates to improvements in apparatus and procedures used in plastic molding.

In molding many plastic materials, it has been conventional to use very high molding pressures and chilled molds and this has effectively limited the size of molded objects because of the cost of molds needed for such objects. While shrinkage is no great problem with chilled molds and thin sections, heavy sections have been found impractical due to the shrinkage.

In the practice of the present invention, low pressures are adequate because the molds are heated before filling and, because of the low pressures, comparatively light and less costly molds can be used. Shrinkage difficulties are overcome by making one wall of the mold of individually movable sections with each of these sections being movable by the filling pressure sufficiently to accommodate enough material to take care of the subsequent shrinkage. Because pressure is maintained on the movable segments or sections during the shrinking period, voids and irregularities are prevented, thereby providing molded objects of high quality. Control of the quantity of material injected may be effected positively and automatically and the heating and cooling of the mold may also be controlled automatically, if desired. It is thus an object of this invention to provide a mold having at least one wall formed of a plurality of sections.

The use of heated molds and low pressure makes possible the use of molds of much less strength than those formerly used and this advantage may be further exploited by using composite molds of much less cost than those previously used, thereby considerably broadening the field of practical molding of large objects.

It is therefore an object of this invention to improve the procedures and apparatus used in molding large objects of plastic material.

It is another object to lower the cost of molds or large objects by making them of composite construction and less mass than before.

It is an additional object to improve the quality of large molded objects by maintaining pressure on the entire surface of the object during the shrinking period. It is a similar object to provide a plurality of follow-up means for shrinkage of large molded objects.

Because heated molds are used in the present invention it is not only possible to mold objects having a plurality of layers of like or unlike composition, but it is also feasible to eliminate or minimize the use of bonding agents in the construction of laminated structures by using the heat of the molding material to fuse the various material together.

It is thus a further object to construct laminated structures by a molding procedure without the use of the customary bonding agents, and wherein the heat of the molding material is used for fusing the layers together.

These and other objects will become apparent upon a study of the following specification and drawings wherein:

Figure 1 is a plan view, with parts in section and parts broken away, showing the apparatus herein described.

Figure 2 is a sectional elevation of the apparatus shown in plan in Figure 1.

Figure 3:
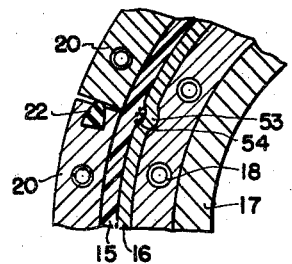
Figure 3 is an enlarged section of a portion of the mold shown in Figure 2.

The plastic molding of large objects is not usually attempted because, with conventional molding techniques, the total pressure to be resisted by the mold and its press is enormous. The present procedure, as best shown in Figures 1 and 2, does not use a press in the normal sense but rather uses a frame-like structure especially designed for the particular molding job to be done. In Figures 1 and 2, frame 10 comprises a strong and rigid outer shell 11 having, for convenience, a shape somewhat similar to that of the object to be molded. Shell 11 has an inner peripheral groove 12 slidably receiving an outer peripheral tongue of a removable floor or support member 13, tie bolts 14 extending through spacers 19 preventing the shell from spreading. Suitable bolt or latch means, not shown, hold member 13 in place during the molding operation and permit removal for removing the molded object, changing the molds, and the like.

The mold for the object 15, in this case a transparent nose piece for an aircraft, includes an inner portion having a relatively thin face 16 of polished stainless steel or the like and a spaced backing member 17 of considerable strength and rigidity. Coils 18 for the circulation of heating or cooling fluids are positioned between the face member 16 and backing member 17 and the voids around the coils and between members 16 and 17 are filled with a relatively low melting point material such as a zinc alloy known as Kirksite. Because only the outer face of member 16 needs to be accurately formed and finished, this composite construction is obviously easier and cheaper to construct than conventional mold members of like capabilities. Any suitable forming procedure may be used for member 16 including the stretching process used in forming sheet metal aircraft parts.

Figure 11:
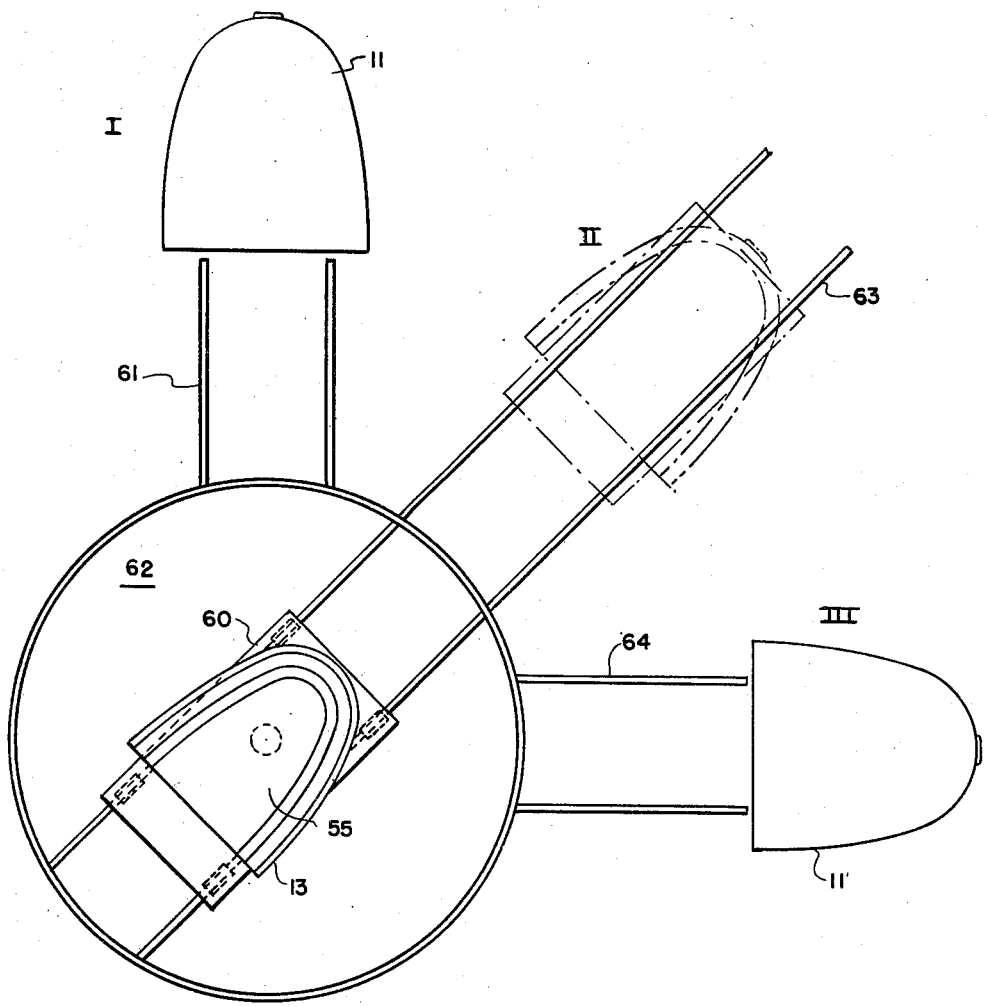
Figure 11 is a schematic view of mold arrangements that may be used for making laminated structures.

The outer mold portions for the present illustration are made of a plurality of sections 20 having equal face areas and a section 21 having a somewhat greater area, the face contours of each of the segments being shaped to properly correspond with the adjacent inner mold and give the desired form to the object 15. To seal the adjacent edges of the movable mold sections, a suitable sealing strip 22 of silicon rubber or the like is keyed into one or the other or both of the adjacent section edges and projects a slight amount to firmly engage the adjacent section edge and yet permit limited movement of the parts. While each of sections 20 and 21 are shown as castings with suitable passages for heating or cooling fluid and have polished steel faces 16', these sections may also be of a three layer composite construction resembling the inner mold portion, if desired, as shown in Figure 11. However, because of the smaller size of these sections and the relatively low bending stresses imposed on them, the construction shown is generally satisfactory and provides the polished face necessary for a good optical surface. Where a less perfect surface is satisfactory, the steel facing may be omitted or may be used without polishing.

Each section is carried on and guided by similar individual hydraulic motors 23 each comprising a cylinder 24 and a piston 25. The cylinders are attached to shell 11 by any suitable means, not shown, and the piston retraction is limited by stop means 26, which may be quickly removable if desired. Other stop means, not shown, may be provided to keep the piston 25 from extending far enough out of cylinders 24 as to cause difficulty in loading the molds and the like. In the present example, the pistons move the sections at such an angle that the sections engage each other at their edges and thus limit the outer travel of the pistons, hence limit stops for extension are considered unnecessary in this case.

The hydraulic motors 23 are operated by a pump 27 receiving fluid from a reservoir 28 and pumping through a pressure regulating valve 29 and a pressure relief valve 30 to distributing piping 31 which connects to all of the motors operating equal sized sections. The pressure relief valve 30 discharges to the reservoir 28 in the event of a pressure beyond its setting and a by-pass 32 with a restriction 33 is connected between the distributing piping 31 and the by-pass so that the pump 27 will always be moving some liquid and so that the pressure in the motors will quickly drop when the pump 27 is shut off. As shown in Figure 1, this hydraulic pressure control apparatus is duplicated for each group of differently sized sections. In this case, only the section 21 differs in size from the others but has its separate apparatus 29', 30', and 31', valves 29' and 30' being set for a higher pressure than their counterparts so that all of the sections will exert the same unit pressure against the object to be molded. Obviously, by using a larger motor, of just the right size, for section 21 a uniform hydraulic pressure could be used throughout.

Figure 10:
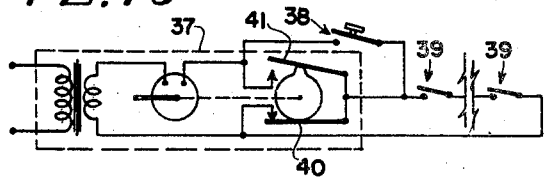
Figure 10 shows schematically another control circuit for operating the valve of the molding equipment.

The plastic material for the molded object may be supplied through a nozzle 34 from a suitable extruder, not shown, the nozzle 34 sealingly engaging a suitable opening in one of the sections, as shown in Figure 2. While only a single nozzle is shown, it is contemplated that the injection may take place simultaneously through a plurality of nozzles from either a single or plural extruders. Flow through the nozzle 34 is controlled by a plug valve or the like 35, the valve being operable manually or, as shown, by linkage 36 operated by a control motor 37, this motor preferably being one which runs through 180° when energized by a signal of one sort and which runs another 180° when energized by an opposite signal, as schematically shown in Figure 10. The linkage 36 provides a mechanical advantage of two for the motor relative to valve 35 so that 180° travel of the motor represents 90° travel of the valve. Motor 37 is operated to open valve 35 by a push button switch 38 and is operated to close the valve by a circuit comprising a plurality of precision switches 39 connected in series so that all of the switches must be closed to close the circuit. As best shown in Figure 10, closure of switch 38 energizes motor 37 through its maintaining switch 40 which keeps the motor running until the switch 40 is opened. Thereafter the motor cannot run until all of the switches 39, only 2 being shown in Figure 10, are closed and complete a circuit through maintaining switch 41, which operates the motor until it is opened, after another 180° of travel. Obviously, other means for stopping the injection may be used, such as stopping the extruder and then permitting the material to freeze in the nozzle due to the cooling of the nozzle.

Figure 9:
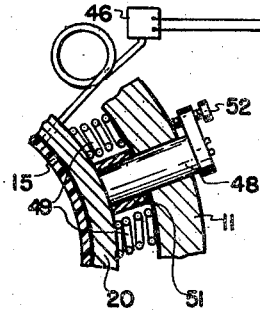
Figure 9 is a partial sectional view showing a modified mold section biasing means and showing schematically a simplified control circuit.
Figure 12:
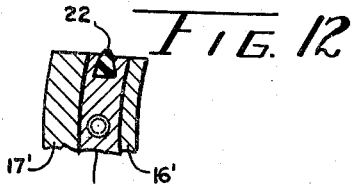
Figure 12 is a partial sectional view of a modified mold member.

Switches 39, as shown in Figure 2, are each carried by a pivoted lever 42, urged against an adjustable stop 43 by a spring 44. Each switch 39 is operated by a member 45 attached to a piston head, a mold section or the like and serves to close the associated switch when the section is sufficiently retracted, in this case sufficiently to engage stops 26. The spring pressed carrier lever 42 provides a strain release mounting for each switch and prevents overstressing by member 45. As an alternative to the plural switches, a single pressure actuated switch 46, Figure 9, may be used, the pressure at which the switch operates being just above that necessary to force the movable mold sections back against their stops. In this figure, which also shows an alternative biasing means for the section, the mold section 20 is carried on a cylindrical slide member 48, the section being urged toward the mold by a plurality of springs 49. Retraction of the slider is limited by a collar 51 around member 48 which engages shell 11 when sufficient pressure is exerted against the segment 20. Assuming the molding material is fluid and disregarding pressure due to the head of the material in the mold, the pressure measured by switch 45 will be uniform throughout the mold and all sections will be against their stop collars at a predetermined pressure, the collars being proportioned to permit enough retraction of the sections to take care of shrinkage upon a subsequent cooling of the molded object. Stop screw 52 is used if necessary to limit the extension of member 48 and its mold section during loading or unloading of the mold but is never adjusted to limit movement of the section during an actual molding operation for, if the section cannot follow the shrinking object and continue to exert pressure against it during cooling, voids and irregular surfaces result.

Although the operation of the present apparatus is now believed obvious, a brief summary may clarify any obscure points. With the apparatus assembled as shown in Figure 2, the inner mold portion and the outer movable sections are first heated to a temperature of 300–400 degrees depending on the molding material, by circulating fluid through the passages provided, the connections and the heating equipment not being shown. Upon the desired temperature being reached, the extruder, not shown, is put in operation, and valve 35 is opened by pushing switch 38. The plastic material then flows into the mold and, when the mold is filled, it starts to build up pressure and force back the movable sections 20 and 21. At least as soon as the mold is filled pump 27 is started and builds up a resisting pressure in hydraulic motors 23. Pressure regulator 29 is set at a value to give a unit pressure on the mold face of a section 20 of 190# per square inch, for instance. Pressure relief valve 30 is set at a slightly higher pressure than 29. When the pressure of plastic material in the mold is sufficiently high, a little above 190# per square inch, the sections 20 and pistons 25 are forced back against the stops 26 and far enough to close switches 39. This same procedure also follows for section 21, with valves 29' and 30' being set for a higher pressure so that the unit pressure exerted by section 21 will be the same as 20. Upon all of switches 39 closing, motor 37 operates valve 35 to a closed position, and the extruder is stopped. Then, with the mold loaded with material, including enough for subsequent shrinkage, cooling fluid is circulated through the mold passages, with pump 27 being continued in operation. As the material shrinks, the pressure exerted by the hydraulic motors 23 keeps sections 20 and 21 firmly against the object and thus maintains true surfaces during this cooling cycle. Because the sections move at slight angles to one another, they tend to come closer together during this phase of the operation but this is permitted by the resilience of the sealing strips 22. When the cooling cycle is completed and the plastic material has set, pump 27 is turned off thereby causing a rapid unloading of motors 23. With the pressure on sections 20 and 21 removed, the mold can now be unloaded and made ready for the next operation. If found necessary for the type of molding being done, suitable retraction means, not shown, may be provided for moving the sections as far back as possible to facilitate the unloading and preparation for the next operation.

Reinforcing ribs are easily formed by suitably grooving the inner mold portion, as shown by 53 in Figures 2 and 3, the increased section providing a reinforcing rib, but, if desired, even greater strength can be had by positioning glass fibers 54 or the like in the grooves so that the resulting ribs of the molded object will be reinforced by the fibres. Where permissible, reinforcing may be used in portions other than the ribs and may include materials other than glass fibre such as wire, wire cloth, and the like. To obtain a good bond between the glass fibres when molding with methyl methacrylate, for instance, it has been found desirable to coat the fibre with a monomer of methyl methacrylate. In this case, the reinforcing ribs and the object as a whole are all molded at the same time by the same procedure as above, but a slight variation in this procedure works very well for laminating material.

Figure 4:
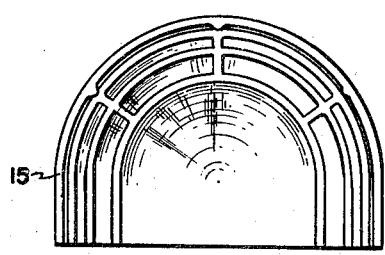
Figure 4 is an end elevation of the object molded by the apparatus shown in Figures 1, 2, 3.
Figure 5:
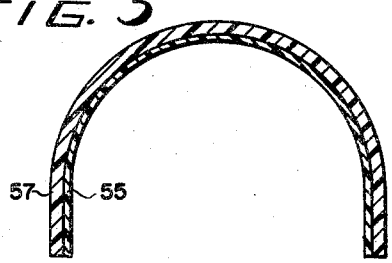
Figure 5 is a cross-section of two layers of a laminated structure.
Figure 6:
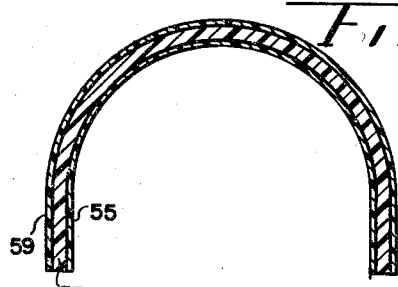
Figure 6 is a similar cross-section showing the completed laminated structure having inner and outer layers and an inner reinforcing layer.

For a laminated structure, a first layer 55 may be molded by the procedure described above, this layer resembling the molded object 15 of the above procedure and as shown in Figure 4. In this case, however, the movable mold segments or sections 20 have rather thick face portions 56 attached thereto for molding this first layer. After the first layer 55 is molded, the inner mold member with the first layer in place is removed from shell 11 and a layer of reinforcing material 57 is draped over 55, as in Figure 5, and secured, if necessary, by clamping means, a few spots of adhesive or the like around the edges, or other such means, and the assemblage put back in shell 11. In the meantime, thick faces 56 have been replaced by thin and polished face portions 58, the difference in thickness between portions 56 and 58 being the thickness of the second and third layers, the third layer to be molded in place. With the assembly in place, the outer or third layer 59 is molded, with the heat and pressure involved in molding the third layer fusing the entire laminated structure together. With the inner and outer layers of methyl methacrylate and the intermediate layer of vinyl butyral, the structure, Figure 6, is not only very strong but also, because the refraction indexes of the two materials are very near alike, only the inner and outer faces of the laminated structure need to be true for good optical properties. The bonding between the layers of such a structure is so good that careful visual inspection fails to reveal the boundaries of the layers. While specific materials are named above, obviously other conventional reinforcing means may be used providing the outer layers, which may be of any suitable material, can either bond with it or bond through it, as where a foraminous reinforcing material is used.

Where a mat of glass fibres is used for reinforcing, either in a laminated structure as shown here, interlayer 57 comprising the mat, or where the mat of fibres is positioned over the male mold portion for a one shot molding, the advantages of the present apparatus are most apparent. Because the fibres, uncompressed, are somewhat bulky, it is difficult to assemble conventional mold portions with the reinforcing in place. However, with the present outer mold portions, retracted, after removing stop means 26, assembly is easy and, because each mold section moves transversely relative to the mold cavity and the reinforcing, there is no tendency to displace the fibres as the sections are moved into their operative positions. To a lesser degree, this same advantage is found where a homogenous reinforcement such as the vinyl butyral member 57 may not lay flat against all parts of the first layer 55. In conventional apparatus, it is difficult to keep layer 57 in place while assembling the necessary mold portions, whereas no difficulty results in the present apparatus due to the greater clearance that can be obtained and due to the aforementioned transverse movement of the mold sections. Before the actual molding, the stop means 26 are replaced.

Figure 7:
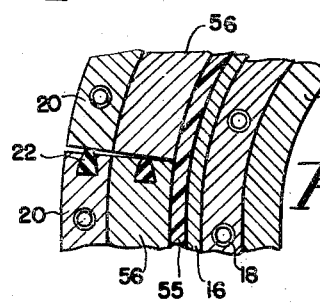
Figure 7 is an enlarged partial sectional view showing the mold arrangement for molding the first layer of a laminated structure.
Figure 8:
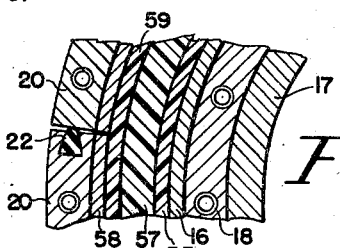
Figure 8 is a view similar to Figure 7 showing the mold arrangement for molding the third layer of the laminated structure.

When the rate of production justifies the added expense, the above laminated structure may be made by a procedure wherein the first layer 55 is formed in apparatus such as shown in Figures 1 and 2 at a position I and then, upon cooling of 55 sufficiently, table 13 along with the male mold portion and layer 55, are slipped out of shell 11 and carried on a suitable truck or the like 60 moving, for instance, on rails 61 to a turn table 62 which is then rotated to deliver the truck and its load to position II on track 63 at which point the reinforcing layer 57 is applied. The truck is then rolled back upon the turn table which is turned to deliver the truck to track 64, position III, at which point table 13 and mold portion 17 with layers 55 and 57 is inserted in a shell 11' having outer mold sections similar to those of 11 but cooperating with 17 to accommodate a thicker section of molding material, in this case the total thickness of the laminated object. By using this arrangement rather than the one shown in Figures 7 and 8, the exchange of mold faces is avoided, this being a slow task because of the heat involved necessitating a cooling period before the faces can be worked on.

As a study of the preceding specification and drawings will reveal many substitutions and equivalents, the scope of this invention should be determined only by the appended claims.

I claim as my invention:

1. A mold for use with plastic materials, said mold having a plurality of walls forming a mold cavity for receiving a plastic charge, one of said walls comprising a plurality of sections, each of said sections having a molding face, means mounting each of said sections for movement in a direction transverse to said face during operation of said mold, means limiting the extent of said movement away from said cavity, said limiting means being arranged to terminate filling of the mold at a predetermined point, and means for applying substantially continuous pressure against each of said sections in a direction toward said cavity during shrinkage of the plastic charge within said mold.

2. A mold for use with plastic materials, said mold having a plurality of walls forming a mold cavity for receiving a plastic charge, one of said walls comprising a plurality of sections, each of said sections having a molding face, means mounting each of said sections for movement in a direction transverse to said face during operation of said mold, sealing means arranged between the edges of adjacent sections, means limiting said movement away from said cavity, said limiting means being arranged to terminate filling of the mold at a predetermined point, and means for applying substantially continuous pressure against said sections in a direction toward said cavity during shrinkage of the plastic charge within said mold.

3. A mold for use with plastic materials, said mold having a plurality of walls forming a hollow space for receiving a plastic charge, one of said walls comprising a plurality of sections, each of said sections having a molding face, means mounting each of said sections for movement in a direction transverse to said face during operation of said mold, means limiting the extent of said movement away from said space, means for applying pressure against each of said sections in a direction toward said space, means for injecting a plastic charge into said hollow space, and switch means operable as a function of all of said sections reaching their limiting positions adapted to terminate injection of said plastic charge into said hollow space.

4. Apparatus for use with plastic material subject to shrinkage during setting comprising a mold having a plurality of walls bounding a space, at least one of said walls comprising a plurality of sections, each of said sections having a molding face, means mounting each of said sections for movement in a direction transverse to its respective molding face during operation thereof, means limiting the extent of said movement in a direction away from said face, switch means operable as a function of all of said sections completing their limited movement, means for injecting plastic material into said molds, means for controlling said injection, and means connecting said switch means in control of said injection controlling means.

5. The method of molding relatively large hollow objects of a certain molding material in a mold having an inner wall and an outer wall, heating to a temperature at which said molding material is fluid, comprising the mold, injecting plastic molding material into the mold and between the walls, urging one of the walls toward the other wall by a predetermined pressure, limiting the movement of the one wall due to the pressure exerted by the molding material, and terminating the injection of the material when the pressure of the material in the mold rises sufficiently to indicate that movement of said movable wall has terminated and maintaining said pressure until said material in the mold has substantially set.

6. The method of molding relatively large hollow objects of plastic material which is fluid at a certain elevated temperature, comprising providing a mold having a movable wall, arranging reinforcing materials between the walls of the mold, heating the mold to said elevated temperature, injecting molding material into the mold, exerting a predetermined pressure against the movable wall in a direction to resist expansion due to the injected material, and terminating the injection of molding material when the movement of the movable wall is sufficient to accommodate enough material to take care of subsequent shrinkage of the object during setting and maintaining said pressure until said material in the mold has substantially set.

7. A mold for plastic material comprising opposing walls forming a mold cavity between them and adapted to receive a charge of plastic material, grooves in one of said walls facing said cavity for forming ribs on the object to be molded, the other wall comprising a plurality of sections arranged adjacent each other, sealing means between the edges of said adjacent sections, said sections being shaped and arranged so that the lines of engagement of said sections overlie said grooves, means for individually moving said sections for movement in lines transverse to the cavity facing surfaces of said sections during operation of said mold, means for individually and simultaneously exerting pressure on each of said sections along their lines of movement and toward said cavity, during shrinkage of said charge, and means for limiting movement of each of said sections away from said cavity, said limiting means being arranged to terminate filling of the mold at a predetermined point.

8. In apparatus for plastic molding, a mold having a pair of spaced walls forming a cavity therebetween, one of said walls comprising a plurality of said sections, means individually mounting said sections for movement in direction substantially normal to the cavity facing surface of the respective sections during operation of said apparatus, means for heating said mold, means for injecting molding material into said cavity, means for controlling the injection of said material, means for exerting pressure on each of said sections towards said cavity, means for limiting movement of each of said sections away from said cavity, and switch means operable as a function of said sections reaching said limiting means and connected in controlling relation to said injection controlling means.

References Cited in the file of this patent

UNITED STATES PATENTS

| | | |
|---|---|---|
| 668,943 | Westervelt | Feb. 26, 1901 |
| 969,539 | Kitchen | Sept. 6, 1910 |
| 1,005,454 | Mijnssen | Oct. 19, 1911 |
| 1,215,064 | Ryan | Feb. 6, 1917 |
| 1,697,741 | Vaughan | Jan. 1, 1929 |
| 2,048,253 | Freyssinet | July 21, 1936 |
| 2,055,742 | Burk | Sept. 29, 1936 |
| 2,092,410 | Wheeler | Sept. 7, 1937 |
| 2,189,154 | Stewart | Feb. 6, 1940 |
| 2,197,465 | Barnetti | Apr. 16, 1940 |
| 2,279,208 | Shaw | Apr. 7, 1942 |
| 2,319,014 | Smith | May 11, 1943 |
| 2,376,085 | Radford et al. | May 15, 1945 |
| 2,381,395 | Brown | Aug. 7, 1945 |
| 2,402,805 | Cousino | June 25, 1946 |
| 2,417,837 | Paggi | Mar. 25, 1947 |
| 2,423,914 | Wacker | July 15, 1947 |
| 2,433,132 | Lester | Dec. 23, 1947 |
| 2,439,716 | Canfield et al. | Apr. 13, 1948 |
| 2,445,290 | Gonda | July 13, 1948 |
| 2,456,467 | Swedlow | Dec. 14, 1948 |
| 2,470,402 | Jobst | May 17, 1949 |
| 2,569,174 | Kardorff | Sept. 25, 1951 |
| 2,600,775 | Hurry et al. | June 17, 1952 |